Aug. 4, 1931.                H. L. DARDELET                1,817,295
                      SCREW THREAD COUPLED MEMBERS
                           Filed June 18, 1930
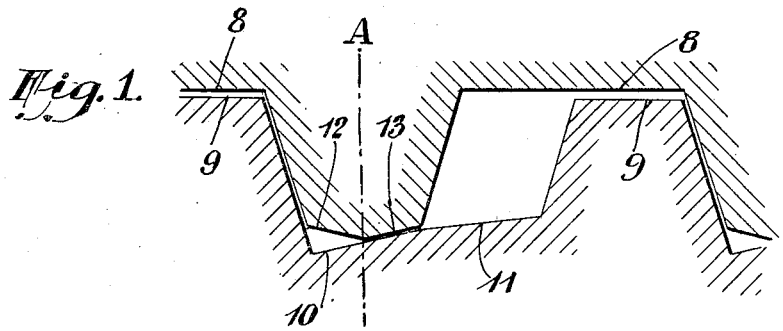
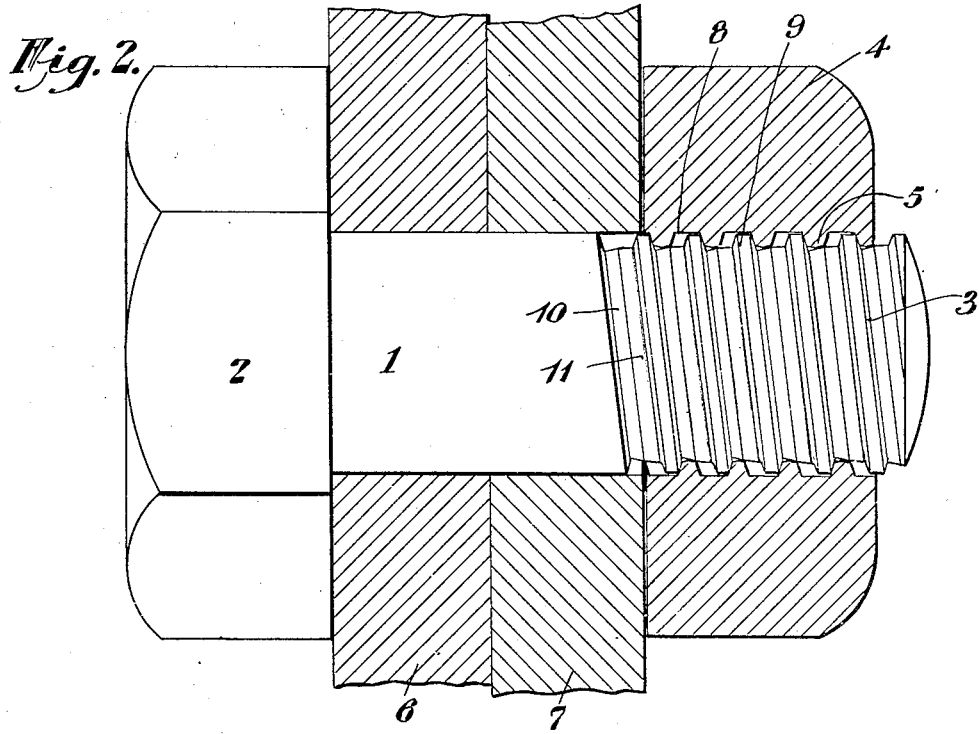
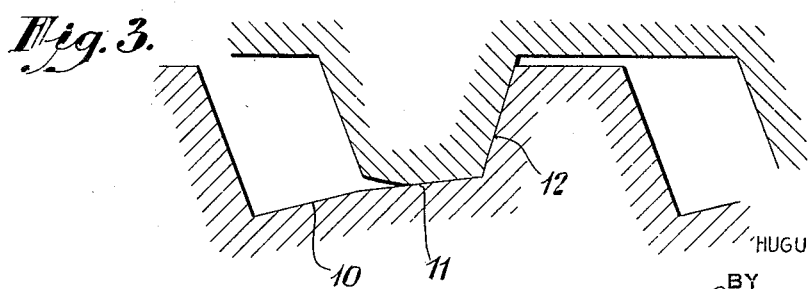
INVENTOR
HUGUES LOUIS DARDELET
BY
ATTORNEYS

Patented Aug. 4, 1931

1,817,295

UNITED STATES PATENT OFFICE

HUGUES LOUIS DARDELET, OF NANTES, FRANCE, ASSIGNOR, BY MESNE ASSIGNMENTS, TO DARDELET THREADLOCK CORPORATION, OF NEW YORK, N. Y., A CORPORATION OF DELAWARE

SCREW THREAD COUPLED MEMBERS

Application filed June 18, 1930, Serial No. 462,001, and in France June 29, 1929.

This invention relates to improvements in that class of self-locking thread coupled members shown in my Patent No. 1,657,244, dated January 24, 1928.

In the drawings:

Fig. 1 is a longitudinal sectional view on a large scale of the coupled members, the internally threaded member being in position for free turning movement on the externally threaded member;

Fig. 2 a longitudinal sectional view showing the coupled members in the form of a bolt and nut, the bolt being shown in side elevation, the nut and the work pieces clamped thereby being shown in sectional view; and Fig. 3 a view similar to Fig. 1 showing the internally threaded member in its locked position on the externally threaded member.

For convenience the screw elements will be described as bolts and nuts, respectively, the head of the bolt being assumed to be at the left as in Fig. 2.

In the construction shown in the drawings, the bolt shank 1 is provided at its left-hand end with a bolt head 2 and at its right hand end it is formed with an external screw thread 3. A nut 4, having an internal screw thread 5, is secured on the threaded portion of the bolt shank. A pair of work pieces 6 and 7 are clamped between the bolt head and the nut.

The thread grooves in the coupled elements are materially wider than their thread ribs to permit of the cross-wise movement of the thread ribs to secure the frictional locking action.

The bottom of the nut thread groove and the top of the bolt thread rib are parallel to the axis of the bolt, as shown at 8 and 9 respectively. The bottom of the groove of the bolt thread is formed by two surfaces 10 and 11 inclined to the axis of the bolt and extending outwardly toward the end of the bolt. These two inclined surfaces are at different inclinations. Surface 10 is nearer the bolt head and is inclined at a great angle than surface 11. Preferably surface 11 is at an angle of approximately 6°; while surface 10 is preferably at an angle of slightly greater degree; and angle of 13° has been found to be satisfactory. It will be understood that the two surfaces 10 and 11 are helicoidal and form the entire bottom or root of the thread between the helicoidal thread ribs. The surface 11 is a frictional binding surface, while surface 10 permits the free rotation of the nut when it is being turned up to the work and before it has exerted pressure on the work piece. The frictional binding surface 11 is approximately equal in width to the surface 10. The crest of the thread rib in the nut is bevelled in opposite directions from a central point, indicated by the dotted line marked A in Fig. 1, to form the surfaces 12 and 13 and each bevelled surface is preferably on an angle approximately equal to the angle of the surface 10. By reason of the double bevel on the nut thread rib, the thread is symmetrical and may be tapped from either side of the nut, and the nut may be screwed on the bolt with either side toward the work piece.

When the nut is assembled on the bolt in free turning relation thereto, it assumes the position shown in Figs. 1 and 2, with the crest of the thread rib directly adjacent to and in close relation with the surface 10 of the thread root. When the nut is screwed up against the work piece and cannot advance on the bolt at the thread pitch, there will be a relative crosswise movement of the thread ribs, as the nut is turned, until the side of the thread rib of the nut contacts with the thrust receiving side 14 of the bolt thread rib, as shown in Fig. 3. During this relative crosswise movement, one of the inclined surfaces 13 of the crest of the thread rib of the nut engages the inclined binding surface 11 of the root of the bolt thread and is frictionally locked thereto. The 6° angle of the surface 11 ensures an efficient frictional lock, and the elasticity of the metal permits a slight compression when the nut thread rib is forced up on the frictional locking surface 11. The sides of the thread ribs in contact positively limit the crosswise movement of the thread ribs and limit the locking action between the nut thread rib and the root of the bolt thread, but do not prevent the continued screwing of the nut on the bolt in work-clamping direction.

What I claim is:

Screw thread coupled members comprising an externally threaded part and an internally threaded part, the thread grooves of both parts being wider than the thread ribs; the root of the thread of the externally threaded part being formed of two surfaces of substantially equal area inclined at different degrees to the axial line of the said member, one of said surfaces being adjacent the thrust receiving side of the external thread rib and forming a frictional locking surface at a less angle than the other inclined surface; and the crest of the rib of the internally threaded part being bevelled in opposite directions from the center of said rib, said bevelled surfaces being approximately at the same degree of angle as the surface of the said thread root having the greater angle of inclination.

In testimony whereof I hereunto affix my signature.

HUGUES LOUIS DARDELET.